US012744370B2

(12) United States Patent
Alawami

(10) Patent No.: US 12,744,370 B2
(45) Date of Patent: Sep. 22, 2026

(54) TRIP CIRCUIT FOR ADJUSTING TRIPPING CHARACTERISTICS OF PROTECTIVE RELAYS

(71) Applicant: SAUDI ARABIAN OIL COMPANY, Dhahran (SA)

(72) Inventor: Hussain Adnan Alawami, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 169 days.

(21) Appl. No.: 18/818,263

(22) Filed: Aug. 28, 2024

(65) Prior Publication Data

US 2026/0066639 A1 Mar. 5, 2026

(51) Int. Cl.
*H02H 3/00* (2006.01)
*H02H 3/08* (2006.01)

(52) U.S. Cl.
CPC .............. *H02H 3/006* (2013.01); *H02H 3/08* (2013.01)

(58) Field of Classification Search
CPC ................................. H02H 3/006; H02H 3/08
USPC ......................................................... 361/93.1
See application file for complete search history.

(56) References Cited

U.S. PATENT DOCUMENTS

2007/0211400 A1* 9/2007 Weiher ..................... H02H 3/32 361/115
2022/0131368 A1* 4/2022 Castillo ................ H02H 1/0015

FOREIGN PATENT DOCUMENTS

CN 110391112 A * 10/2019 ........... H01H 47/002
TW 686833 B1 * 3/2020

OTHER PUBLICATIONS

"Relay scheme design using microprocessor relays," 2015 68th Annual Conference for Protective Relay Engineers, College Station, TX, USA, 2015, pp. 405-447 (Year: 2015).*

* cited by examiner

*Primary Examiner* — Sreeya Sreevatsa
(74) *Attorney, Agent, or Firm* — Vorys, Sater, Seymour and Pease LLP

(57) ABSTRACT

A trip circuit for protecting a power distribution system includes a trip coil. The trip coil includes a first coil terminal coupled to a first bus line. Moreover the trip circuit includes a self-power relay that provides energy to the first bus line and a second bus line. Further, the trip circuit includes a normal setting contact and a reduced setting contact each coupled to the second bus line and a second coil terminal of the trip coil in parallel. The self-power relay provides energy to the first and second bus line via Impulse Outputs (POs). Additionally, the switch can control whether the trip circuit operates in a normal setting or a reduced setting.

14 Claims, 5 Drawing Sheets

TRIP CIRCUIT FOR ADJUSTING TRIPPING CHARACTERISTICS OF PROTECTIVE RELAYS

FIELD OF THE DISCLOSURE

The present disclosure relates generally to protective relays and, more particularly, to tripping characteristics of protective relays in the absence of a power supply.

BACKGROUND OF THE DISCLOSURE

An arc flash is an electrical explosion or discharge that results from a short circuit. An arc flash can occur when a high-voltage electric current jumps across a gap from one conductor to another or the ground, thereby producing intense light and heat. Equipment failure, human error, accidental contact with energized parts, dust, corrosion, and faulty installations are examples that can cause an arc flash. Furthermore, consequences of an arc flash can include heat that can cause severe burns, intense light that may damage eyesight, a pressure wave that can rupture ear drums or break bones, and flying shrapnel from damaged equipment. Accordingly, an arc flash is a significant safety concern in electrical engineering and industrial environments that requires careful attention to protect workers and equipment. Systems can be designed and maintained to prevent failures, as well as employ arc flash detection and suppression systems to mitigate failures.

Circuit breakers can include an Energy Reduced Maintenance Switch (ERMS) designed to enhance safety during maintenance activities by temporarily lowering energy levels in electrical equipment. Specifically, an ERMS can reduce the arc flash energy level when maintenance personnel are near energized electrical equipment. For example, when maintenance is required, the ERMS can be activated to adjust trip settings of the circuit breaker to a more sensitive setting. That is, by lowering the trip threshold via the ERMS, the circuit breaker will trip more quickly in response to a fault, which reduces energy released during an associated arc flash. More specifically, an ERMS switch can adjust a setting of a protection relay that defines a trip threshold associated with a trip coil. Thus, when the ERMS is activated, the relay responds more quickly to overcurrent conditions. However, to enable the relay to change the settings, a DC or AC power supply must be provided to the relay. For self-powered relays, an external portable DC power supply can be used. Alternatively, two relays can be employed having different settings where the ERMS will switch between these two relays.

Another feature that can be included in modern electrical power systems is sulfur hexafluoride (SF6) switchgears. An SF6 switchgear is an electrical device that is employed to control, protect, and isolate equipment in electrical power systems. Specifically, an SF6 switchgear is a high-voltage switchgear that utilizes SF6 gas as an insulating and arc-quenching medium. Accordingly, SF6 switchgears are employed in applications such as power transmission and distribution, substations, and industrial electrical systems. Moreover, SF6 switchgears can have different configurations, such as a gas-insulated switchgear (GIS) and air-insulated switchgear (AIS). Furthermore, SF6 switchgears require proper handling and maintenance, as well as regular monitoring to prevent leakage.

SUMMARY OF THE DISCLOSURE

Various details of the present disclosure are hereinafter summarized to provide a basic understanding. This summary is not an exhaustive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to an embodiment consistent with the present disclosure, a trip circuit includes a trip coil with a first coil terminal coupled to a first bus line. The trip circuit further includes a self-power relay that provides energy to the first bus line and a second bus line. Additionally, the trip circuit includes a normal setting contact and a reduced setting contact each coupled to the second bus line and a second coil terminal of the trip coil in parallel.

According to another embodiment consistent with the present disclosure, a trip circuit for protecting a power distribution system includes a trip coil. The trip coil has a first coil terminal coupled to a first bus line and a second coil terminal coupled to a first Binary Output (BO) terminal of a first subset of BOs of a self-power relay. The trip circuit further includes a switch having a first switch terminal coupled to the second coil terminal and a second switch terminal coupled to a second Binary Output (BO) terminal of a first subset of BOs of the self-power relay. The second switch terminal is further coupled to a second bus line. Moreover, the self-power relay provides energy to the first and second bus line via Impulse Outputs (POs).

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

Figure 1:
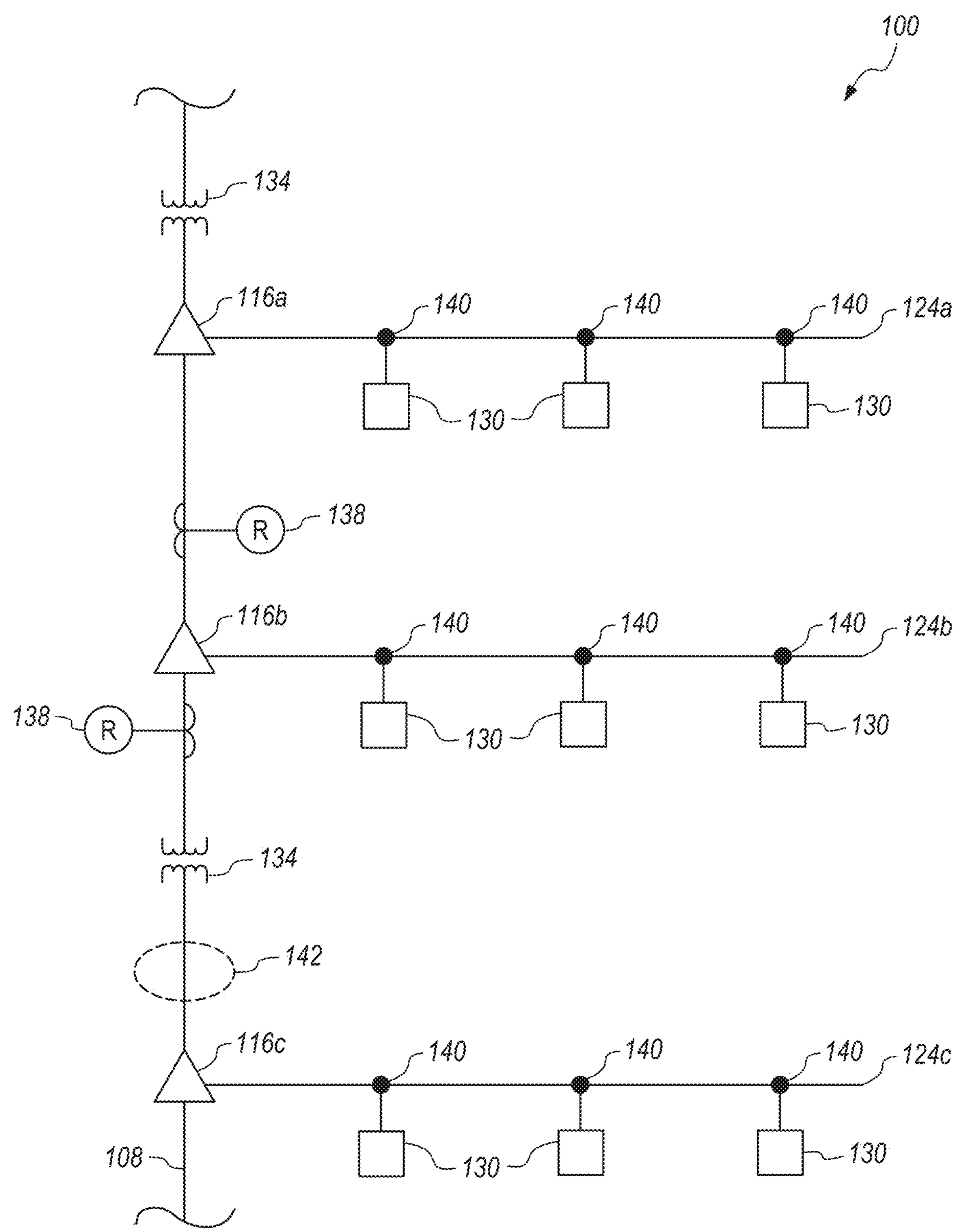
FIG. 1 is a block diagram of an example power distribution system.

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

Embodiments in accordance with the present disclosure generally relate to protective relays and, more particularly, to tripping characteristics of protective relays in the absence of a power supply. Specifically, a power distribution system can have a plurality of lateral distribution lines that extend from a given feeder distribution line. The lateral distribution lines can be connected to the given feeder line via a substation. In some examples, the lateral distribution lines can be connected to the given feeder line via a transformer. Moreover, a substation can have a current transformer (CT) that monitors and protects electrical circuits downstream from the substation. More specifically, a CT link can step down high currents from a primary circuit to provide current at a lower level measurable by instruments. Further, the CT link can provide input to protective relays, which can trip circuit breakers in response to overcurrent or fault conditions.

In existing systems, CT switching requires manually operated switches to change connections of the CTs, which poses a risk for generating dangerous high voltages and arc flashes. In some existing systems, motorized or electronically controlled switches can change the CT connections, but require an external direct current (DC) power supply. For example, ERMS can be integrated into a switchgear and circuit breaker to protect high-energy elements of a power distribution system, such as feeder lines and distribution points. Specifically, the ERMS can be activated to adjust sensitivity of the circuit breaker, such that the circuit breaker's trip settings can become more sensitive to current. That is, lower trip settings can cause a faster trip response to abnormal current, thereby reducing duration and energy of an arc flash. Moreover, protective relays, informed by CT measurements, operate based on adjusted settings provided by the ERMS to ensure the power distribution system responds appropriately to current.

Particularly, some existing systems require the relay to be controlled with a DC power supply. Accordingly, changing the relay from an instantaneous setting (e.g., state) to a normal setting (e.g., state) and vice-versa, requires an operator or external power supply in existing systems. Further, an operator or external power supply controlled relay presents additional issues such as arc flash exposure to the operator while switching. Furthermore, a relay controlled by another power system relies on safety from another point of failure at the external power supply, which further increases costs. Additionally, existing systems may require that the external power supply is portable to support multiple relays, ERMSs, switchgears, circuit breakers, or even substations, such that the external power supply may not be available or effective to prevent arc flash or other issues within a power distribution system.

Instead of relying on two relays with different settings, or an external DC power source, a switch can be installed in a trip circuit to select the setting of the relay. For example, the relay can have complete settings (e.g., normal& instantaneous) with a first and second output contact. Accordingly, the first and second output contacts can be integrated (e.g., coupled) with a trip circuit. For example, the first output contact can be placed in series with a normal setting contact of the ERMS, whereas the second output contact can be placed in series with a reduced setting contact of the ERMS. Further, the first output contact and normal setting contact can be positioned in parallel with the second output contact and the reduced setting contact to form a control circuit. The contacts can further be in series with a trip coil of the associated ERMS.

FIG. 1 illustrates an example power distribution system 100. Specifically, the power distribution system 100 can include a transmission line 108, which can carry electrical power from generation stations to substations 116. Accordingly, the substations 116 can step down voltage for distribution through feeder lines 124. The feeder lines 124 can further have loads 130, which can be lateral lines that provide power to utility consuming premises. In some examples, the transmission line 108 can be a feeder, whereas the feeder lines 124 can instead be lateral lines provided by the substations 116, such that the loads 130 can be power consuming premises. A premises can be residential, utility, commercial, or other type of building that consumes power and other utilities. Furthermore, the transmission line 108 can include transformers 134 and relays 138.

The power distribution system 100 can have various substations 116 that step down power to different levels for different purposes. For example, the substations 116 that step down power from the transmission line 108 can include a first substation 116*a*, a second substation 116*b*, and a third substation 116*c*. The first substation 116*a* can be a main distribution substation that provides 13.8 kilovolts (kV) to a first feeder line 124*a*. Similarly, the substation 116*b* can also provide 13.8 kV to a second feeder line 124*b*. However, the first substation 116*a* may have more complex systems and higher capacity compared to the second substation 116*b*.

The third substation 116*c* can be a low voltage (LV) substation. Compared to the first and second substations 116*a,b*, the third substation 116*c* can provide voltage to the respective third feeder line 124*c* at about 0.48 kV. Therefore, the power provided by the third feeder line 124*c* may be directly provided to loads 130 such as homes, offices, equipment, or power consuming premises that do not require higher voltage. In some examples, the first and second feeder lines 124*a,b* may require additional substations 116 or transformers downstream to provide power at a safe and usable level to respective loads. Moreover, an SF6 switchgear 140 can be positioned between each load 130 of the second feeder line 124*b* and the second substation 116*b*. Additionally, an SF6 switchgear 140 can be connected to the ERMS of the third substation 116*c*. In other examples, an SF6 switchgear 140 can be connected to an ERMS of each substation 116, as well as between each substation 116 and each load 130 downstream from the respective substation 116.

In existing systems, the third substation 116*c* has high incident energy due to the absence of instantaneous protection, such as differential protection. For example, the third substation 116*c* may be able to resolve faults downstream from the third substation 116*c* at the third feeder line 124*c*. However, the ERMS of the third substation 116*c* cannot resolve the high incident energy upstream from the substation 116*c* at a high energy area 142, which can be an incomer breaker. That is, the ERMS cannot resolve high energy on the transmission line 108 at the high energy area due to the absence of a DC system in the associated SF6 switchgear. Rather, in an emergency, a portable DC system would need to be provided to the third substation 116*c* in order to change settings of the associated relay in existing systems. Alternatively, existing systems may require an operator to manually switch the settings of the relay, which places the operator in danger of the arc flash, as well as the power distribution system 100. Specifically, self-power relays rely on current of a Current Transformer (CT) for power. Therefore, the ERMS is not applicable because the relay would need power through the CT current in order to change relay settings. Moreover, the self power relays have only one output that provides 24-48 volts (DC) to an associated breaker trip coil.

Instead of requiring an external source to change settings of the relay, a switch can be provided to the trip circuit of the third substation 116*c*. Specifically, the switch can control which output contact is used for tripping an associated circuit breaker. More specifically, the switch can be mounted on the switchgear to adjust tripping operations of the trip circuit of a respective circuit breaker. For example, if energy is below the predetermined threshold, the relay can operate in a normal setting (e.g., state) based on a state of the switch (e.g., "off"). If energy is at or above a predetermined threshold, the relay can operate in an instantaneous setting based on the respective state of the switch (e.g., "on"). Thus, applying the switch to the relay removes the need for an external source to switch settings, such as a power supply. Rather, the switch can be applied to the relay to adjust tripping operations of the trip circuit. Further, the switch can remedy the high incident energy at the high energy area 142 with only one relay instead of two, and without the need for a power supply.

Figure 2:
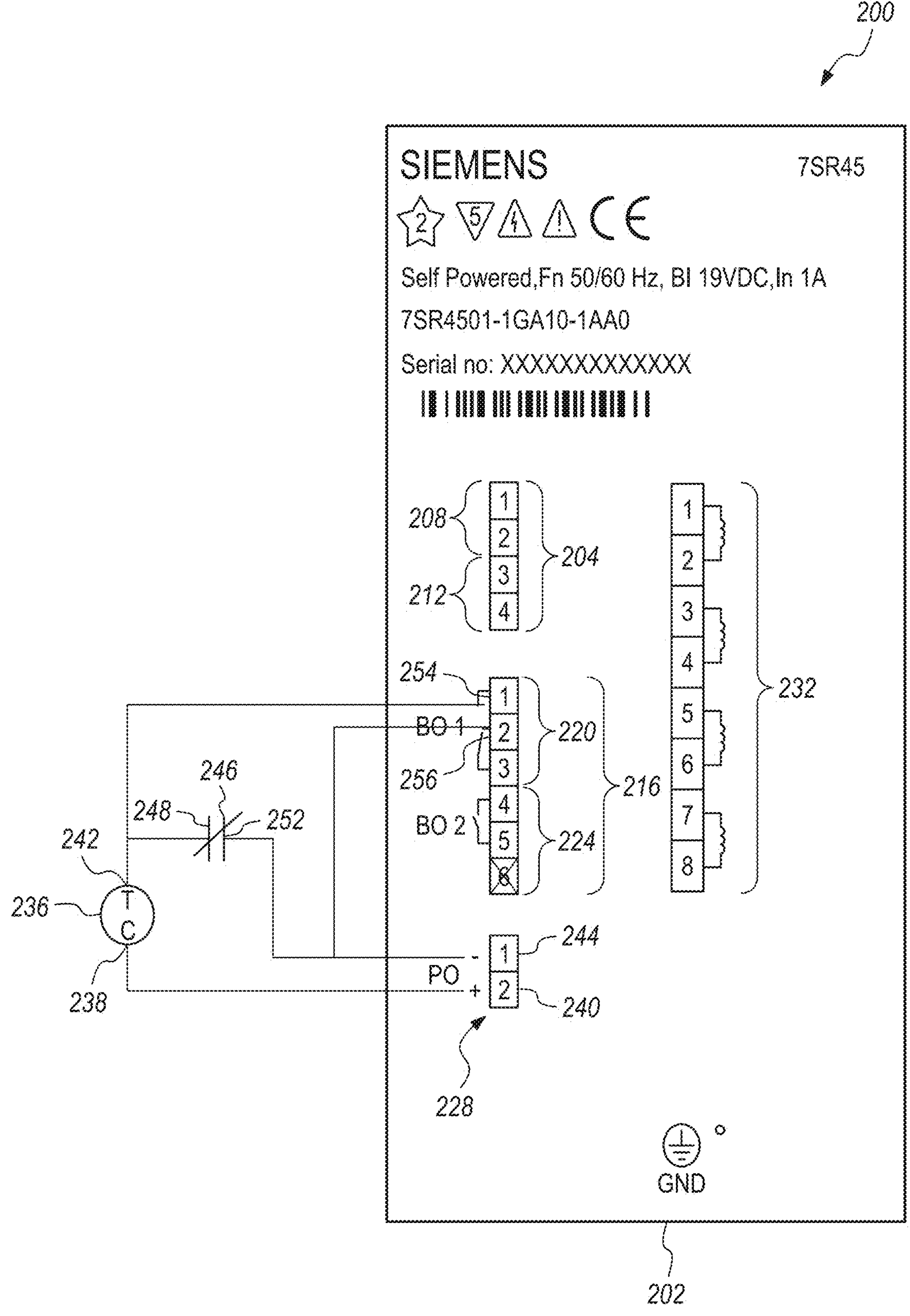
FIG. 2 is a diagram of a self-power relay.

FIG. 2 illustrates an example diagram 200 of an example self-power relay 202, which can be an SF6 relay. More specifically, the diagram of the self-power relay 202 includes a set of binary inputs (BIs) 204, which can further include a first subset of BIs 208, and a second subset of BIs 212. The self-power relay 202 can further include a set of Binary Outputs (BOs) 216, which further includes a first subset of BOs 220 and a second subset of BOs 224. Moreover, the self-power relay 202 can also include a set of Impulse Outputs (POs) 228. Furthermore, the self-power relay 202 can include CT wire connections 232. The POs 228, BIs 204, BOs 216, and CT wire connections 232 can be implemented as user-friendly pluggable type terminals at a rear connection of the self-power relay 202.

The self-power relay 202 can be energized through current fed from the connected CT via the CT wire connections 232. Accordingly, when fault current is detected and the overcurrent element of the self-power relay 202 is operational, the self-power relay 202 energizes a trip coil 236 by providing the trip coil 236 with DC power via the POs 228. The trip coil 236 is designed to initiate a tripping mechanism of an associated circuit breaker (not shown), causing it to open and disconnect an electrical circuit in response to fault conditions, such as arc flash, overcurrent, short circuits, or other abnormal conditions. Particularly, the trip coil 236 includes a first coil terminal 238 coupled to a positive PO terminal 240, as well as a second coil terminal 242 coupled to a negative PO terminal 244.

A switch 246 can be integrated with the trip coil 236 and the self-power relay 202 to adjust tripping operations of the trip coil 236. Specifically, the trip coil 236 can be an element of a circuit breaker that initiates a tripping mechanism to interrupt the corresponding electrical circuit (e.g., power distribution system 100) in the event of a fault condition. The switch 246 can have a first switch terminal 248 coupled to the second coil terminal 242 of the trip coil 236. Moreover, the second switch terminal 252 can also be coupled to the negative PO terminal 244, such that the PO 228 can trip the trip coil 236 through the second BO terminal 256. Additionally, the second coil terminal 242 of the trip coil 236 can be coupled directly to the first BO terminal 254 of the first subset of BOs 220.

As illustrated, the switch 246 is in a normal state, such that the ERMS is off and operating in a normal setting. The first subset of BOs 220 associated with the normal setting will be energized during normal operations, such that the PO 228 will trip the trip coil 236 through first subset of BOs 220. That is, when the switch 246 is open, the trip coil 236 is energized only by the first BO terminal 254. Conversely, when the ERMS is in an on state, the switch 246 is in a closed state. Accordingly, the first subset of BOs 220 can be closed in addition to the POs 228, such that the trip coil 236 is energized by both the first subset of BOs 220 and the POs 228. That is, the closed state of the switch 246 can complete the trip circuit.

Figure 3:
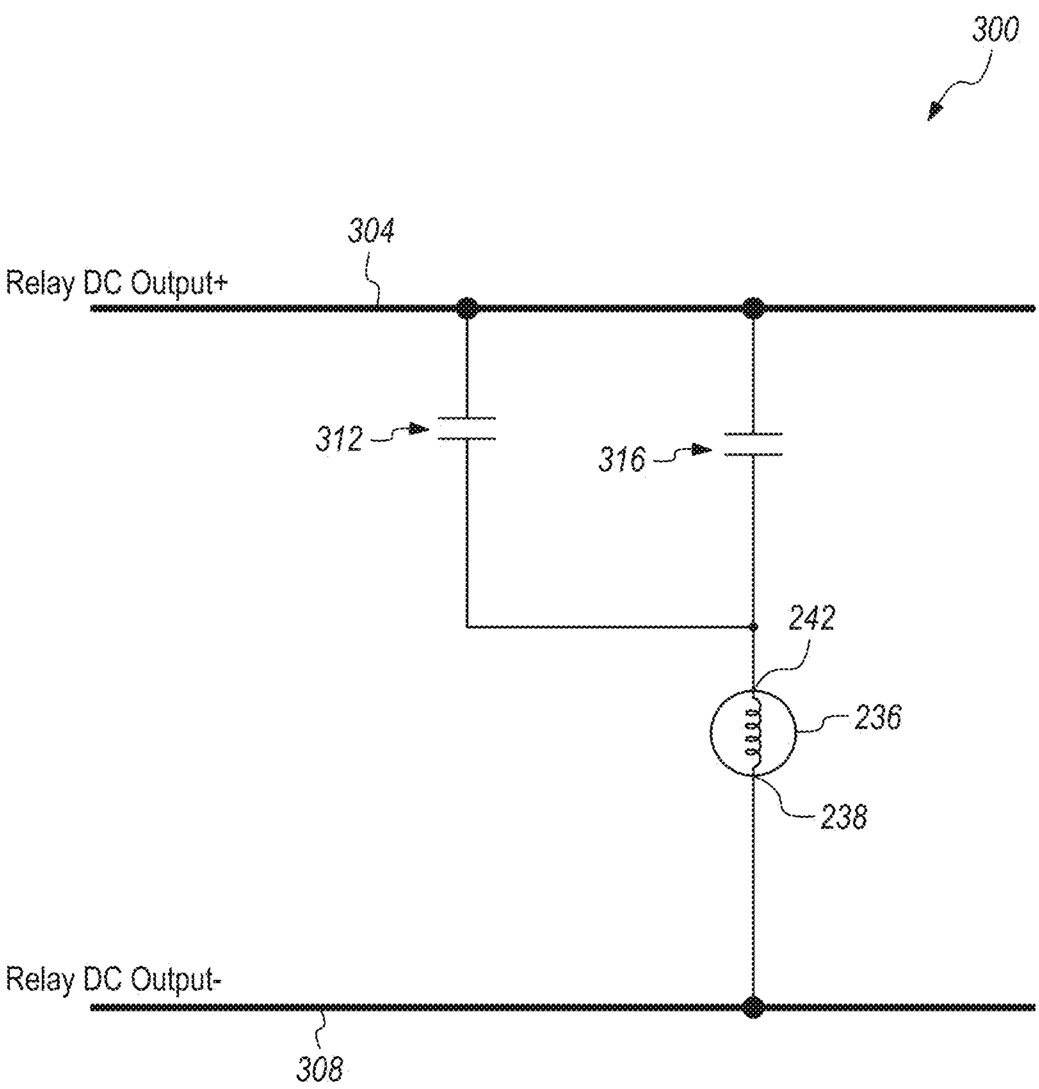
FIG. 3 is an example trip circuit.

FIG. 3 illustrates an example diagram of a trip circuit 300. The trip circuit 300 can include the trip coil 236 of FIG. 2, which is powered by at least the POs 228 of FIG. 2. For example, the first coil terminal 242 is coupled to a positive bus line 304 and the second coil terminal 238 is coupled to a negative bus line 308. Specifically, the trip circuit 300 can include a settings contact 312 and a mode contact 316. Accordingly, the first coil terminal 242 is coupled to the positive bus line 304 through parallel paths having either the settings contact 312 or mode contact 316. That is, the mode contact 316 can be controlled by an ERMS associated with the trip circuit 300 and the settings contact 312 can be controlled by the relay (e.g., relay 202 of FIG. 2). As explained with respect to FIG. 2, when the ERMS is in an on state, the mode contact 316 can close. Accordingly, the settings contact 312 can also be closed during operations under normal settings. Therefore, the trip coil 236 can be energized by both the POs 228 due to the operation of the instantaneous settings and the first subset of BOs 220 operating in normal settings, such that the trip coil 236 is more sensitive to overcurrent. Alternatively, the mode contact 316 can open in response to the ERMS being in an off state, which isolates activating the trip coil directly from PO 228 contact.

Moreover, the self-power relay 200 can have two types of settings, such as normal and reduced settings. The POs 228 of the relay 200 can be energized during the normal and reduced settings. Accordingly, the switch 246 can isolate the POs 228 from the trip coil 236. Rather, the switch 246 can trip the trip circuit 300 through the first BO terminal 254 which is associated with normal settings (e.g., the settings contact 312). If the ERMS is needed, the switch 246 can be closed to directly connect the POs 228 to the trip coil 236 in the instantaneous setting (e.g., mode contact 316).

Figure 4:
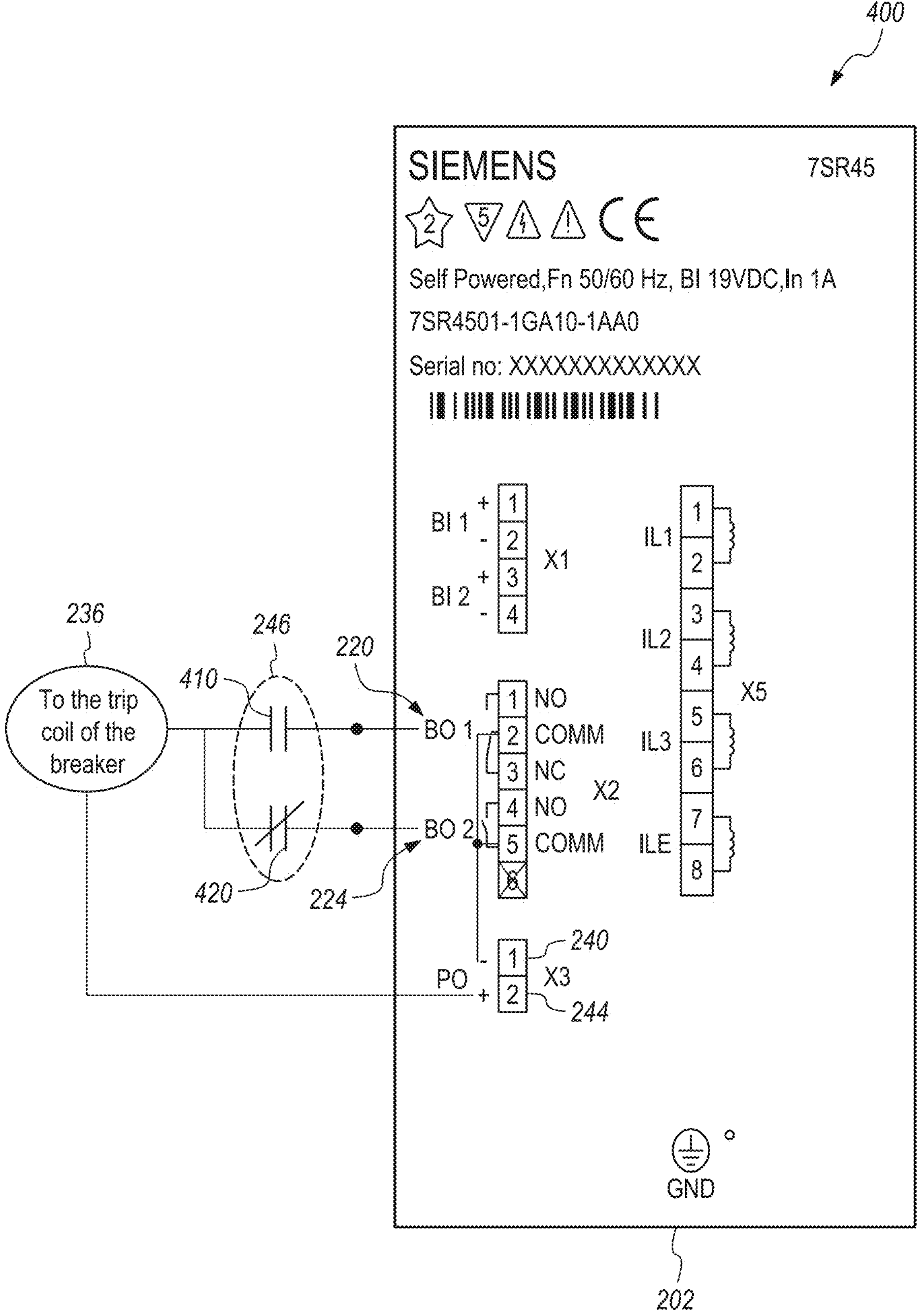
FIG. 4 is another diagram of a self-power relay.

FIG. 4 illustrates another example diagram 400 of the self-power relay 202. In example diagram 400, the first subset of BOs 220 are coupled to a normal setting contact 410 and the second subset of BOs are coupled to a reduced setting contact 420. In some examples, the normal setting contact 410 can be the settings contact 312 of FIG. 3 and the reduced setting contact 420 can be the mode contact 316. The normal and reduced setting contacts 410, 420 can be operated by a switch (e.g., switch 246 of FIG. 2). Specifically, the switch can be controlled by a control signal provided by the ERMS. In other examples, the switch can be controlled by an operator to change a state of the normal and reduced setting contacts 410, 420. Moreover, the first and second subsets of BOs 220,224 can provide a DC voltage to the trip coil 236 through PO contact and are arranged in parallel. That is, the first subset of BOs 220 can be associated with the normal settings of the self-power relay 202, such that the self-power relay 202 will energize the trip coil 236 under the normal settings. Conversely, the second subset of BOs 224 can be associated with the reduced settings of the self-power relay 202, such that the self-power relay will energize the trip coil 236 under the reduced settings. Accordingly, the switch can control which of the normal or reduced setting contacts 410, 420 is closed to complete the trip circuit in either a normal or reduced setting of the relay 202.

Figure 5:
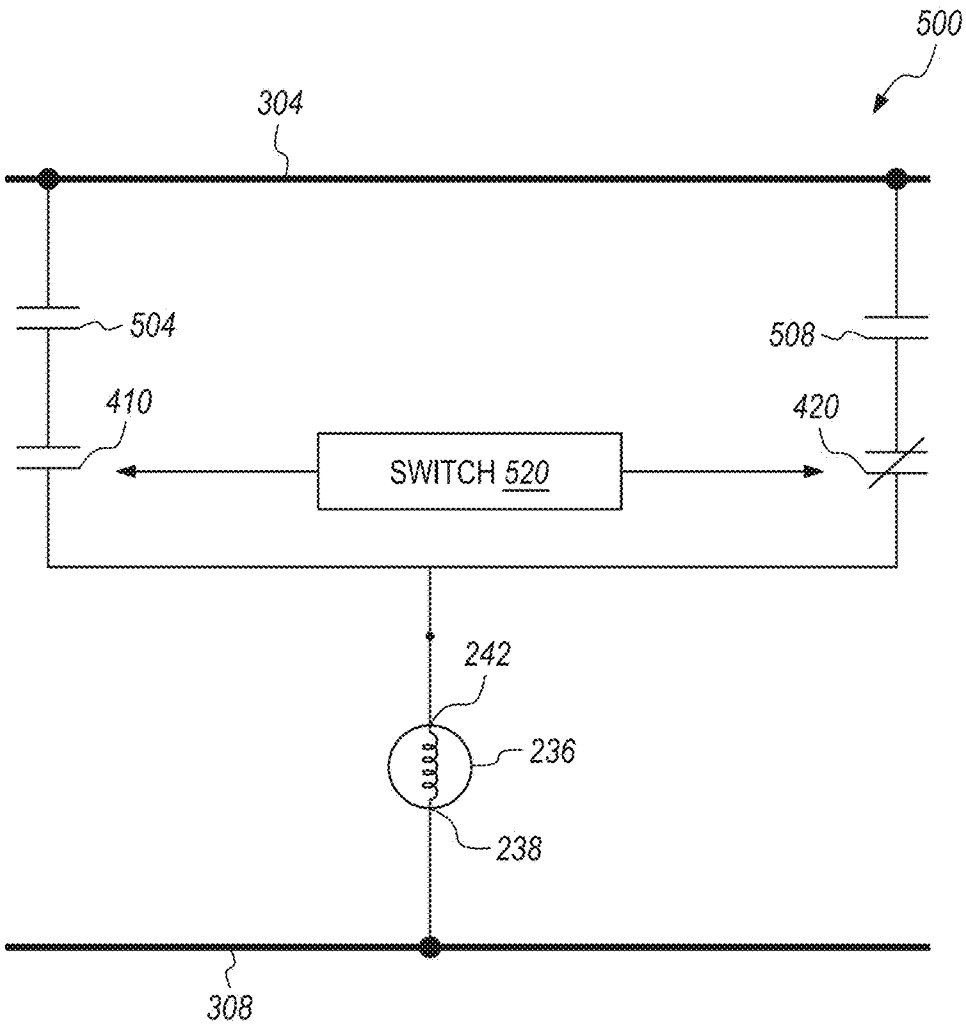
FIG. 5 is another example trip circuit.

FIG. 5 illustrates another trip circuit 500 corresponding to the example diagram 400 of the self-power relay 202. Specifically, the trip circuit 500 can include positive bus line 304 and a negative bus line 308. Here, the trip coil 236 can be coupled to the negative bus line 308 via the second coil terminal 238. The first coil terminal 242 can be coupled to contacts associated with the BOs 216 (e.g., BOs 216 of FIG. 4) of the self-power relay 202 and to controllable contacts. Specifically, a first output contact 504 can be associated with the first subset of BOs 220, which are associated with normal settings of the self-power relay 202. Parallel to the first output contact 504 can be a second output contact 508 that is associated with the reduced settings of the self-power relay 202. Therefore, the first and second output contacts 504,508 can be coupled to the positive bus line 304. Furthermore, the first output contact 504 can be coupled in series with a normal setting contact 410 between the first output contact 504 and the trip coil 236. Similarly, the second output contact 508 can be coupled in series with a reduced setting contact 420 between the second output contact 504 and the trip coil 236.

Furthermore, the normal setting contact 410 and reduced setting contact 420 can be controlled by a switch 520. In an example, the switch 520 can be a dual pole dual throw (DPDT) switch that can select either the normal setting or reduced setting via the respective contacts 410,420. In another example, the switch 520 can be a single pole dual throw (SPDT) switch configured to operate both the normal and reduced setting contacts 410,420. Further, the switch 520 can be controlled by the ERMS, which provides a control signal to close one of the setting contacts 410,420 and open the other setting contact 410,420 For example, if operating in a normal mode, the normal setting contact 410 can be closed and the reduced setting contact 420 can be opened. Therefore, the second output contact 508 associated with the reduced settings is isolated from the trip coil 236. Accordingly, the first output contact 504 can be operated by the self-power relay 202 to close and energize the trip coil 236.

In another example, the trip circuit 500 can be operated in a reduced setting. For example, the reduced setting contact 420 can be closed and the normal setting contact 410 can be opened. Therefore, the first output contact 504 is isolated from the trip coil 236. Accordingly, the second output contact 508 can be operated by the self-power relay 202 to close and energize the trip coil 236. Thus, the switch 520 can operate the self-power relay 202 to operate in either a normal setting or reduced setting by opening and closing the normal and reduced setting contacts 410,420.

Referring back to FIG. 1, implementation of the switch (e.g., switch 246 of FIG. 2) to control the setting (e.g., reduced or normal) of the self-power relay (e.g., self-power relay 202 of FIGS. 2 and 4) can be employed to remedy the high incident energy at the high energy area 142 along the transmission line 108. For example, incident energy at the high energy area 142 can exceed a max (PPE) Arc rating while the self-power relay 202 is operating under normal settings. Currently, an EMRS positioned downstream from the high energy area 142 cannot resolve this high incident energy due to the absence of a DC system. Therefore, the ERMS is not applicable since the relay would need a current (e.g., DC) to change the settings from normal to reduced and vice-versa. Here, the incident energy at the high energy area 142 can be about 55.281 calories per square centimeter (cal/cm$^2$) at about 45 cm, which exceeds personal protective equipment (PPE) Arc Rating requirements during normal settings. For example, operators may only have access to PPE rated for up to 25 cal/cm$^2$. However, by applying a switch (e.g., switch 246 of FIG. 2) or contacts (e.g., the normal and reduced setting contacts 410,420 of FIGS. 4-5) controlled by a switch or ERMS in a trip circuit (e.g., trip circuits 300,500), the incident energy is reduced to a level required by standards and regulations. Specifically, in this example the incident energy in compliance PPE Arc Rating requirements can be reduced to 11.977 cal/cm$^2$ at about 45 cm. Therefore, incident energy upstream from a self-power relay 202 and/or associated ERMS can be reduced by applying a switch or contacts to route a trip circuit as described above. Moreover, trip circuits 300,500 can be applied to SF6 switchgears along the power distribution system (e.g., 200), which feed downstream power distribution elements (e.g., substations 116 of FIG. 1) and loads (e.g., loads 130 of FIG. 1), which commonly experience high upstream incident energy.

Figure 6:
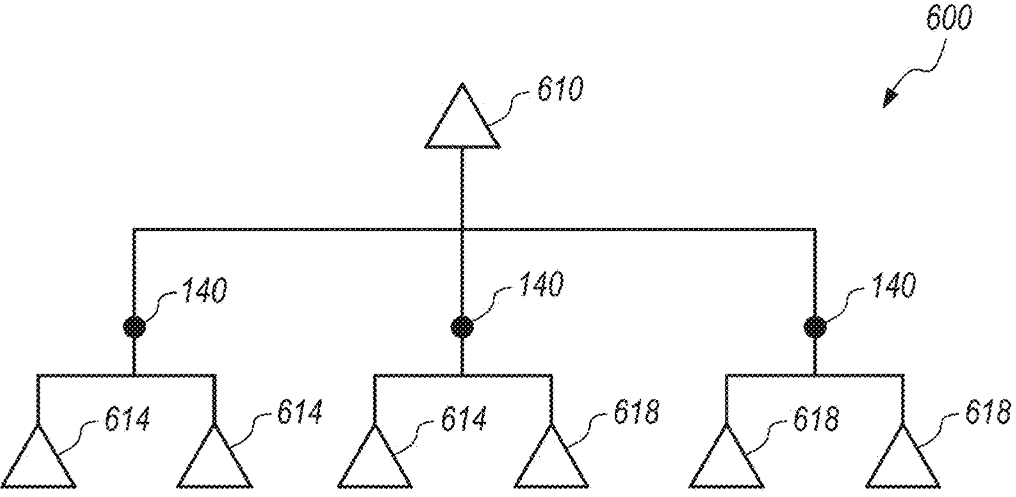
FIG. 6 is a block diagram of another example power distribution system.

FIG. 6 is a diagram of another power distribution system 600, beginning with a main substation 610. In this example, the main substation 610 can distribute power to various SF6 switchgears 140 along the first feeder line 124*a*. Accordingly, various substations (e.g., substations 116 of FIG. 1) can receive power from the first feeder line 124*a* via the SF6 switchgears 140. For example, secondary substations 616 (e.g., of a type corresponding to the second substation 116*b* of FIG. 1) can receive power from the SF6 switchgears 140, as well as low power substations 618 (e.g., a type of substation corresponding to the third substation 116*c* of FIG. 1). Accordingly, each of the SF6 switchgears 140 can have an associated circuit breaker and integrated self-power relay (e.g., self power relay 202 of FIGS. 2 and 4). Thus, trip circuits (e.g., trip circuits 300, 500 of FIGS. 3 and 5) can be employed to manage power across the first feeder line 124*a* and resolve high energy incidents that may occur upstream from the SF6 switchgears 140 on the first feeder line 124*a*. Furthermore, secondary substations 616 and low power substations 618 can receive power from lateral lines 620 that extend from the SF6 switchgears 620. Accordingly, secondary and low power substations 616,618 can have self power relays or switchgears 140 that can resolve high energy incidents that occur upstream on the lateral lines 620. Thus, the self-power relays 202, and more specifically the associated trip circuits, enable protection of upstream components across the power distribution system 600 without requiring external DC power systems. Specifically, arc flash and open circuits can be avoided by implementing the trip circuits 300,500 of FIGS. 3 and 5 at any position within a power distribution system 100,600 that employs CT switching.

Embodiments disclosed herein include:

A. A trip circuit comprising a trip coil with a first coil terminal coupled to a first bus line; a self-power relay that provides energy to the first bus line and a second bus line; a normal setting contact and a reduced setting contact each coupled to the second bus line and a second coil terminal of the trip coil in parallel.

B. A trip circuit for protecting a power distribution system comprising a trip coil with a first coil terminal coupled to a first bus line and a second coil terminal coupled to a first Binary Output (BO) terminal of a first subset of BOs of a self-power relay; a switch having a first switch terminal coupled to the second coil terminal and a second switch terminal coupled to a second BO terminal of the first subset of BOs of the self-power relay and a second bus line, wherein the self-power relay provides energy to the first and second bus line via Impulse Outputs (POs).

Each of embodiments A and B may have one or more of the following additional elements in any combination: Element 1: a first output contact in series with the normal setting contact and a second output contact in series with the reduced setting contact. Element 2 further comprising a switch to control the normal setting and reduced setting contacts. Element 3: wherein the trip circuit operates in a normal setting in response to the switch closing the normal setting contact and opening the reduced setting contact. Element 4: wherein the first output contact is closed by the self-power relay to energize the trip coil. Element 5: wherein the trip circuit operates in a reduced setting in response to the switch opening the normal setting contact and opening the reduced setting contact.

Element 6: wherein the second output contact is closed by the self-power relay to energize the trip coil. Element 7: wherein the first output contact is coupled to a first subset of Binary Outputs (BOs) of the self-power relay and the second output contact is coupled to a second subset of BOs of the self-power relay. Element 8: wherein the first and second bus lines are coupled to Impulse Outputs (POs) of the self-power relay. Element 9: wherein the trip circuit is controlled to operate in a reduced setting from a normal setting by completing the trip circuit in response to closing the switch. Element 10: wherein the trip circuit is coupled to a self-power relay of a circuit breaker at a substation along a transmission line that experiences incident energy above a predetermined threshold at an area upstream from the circuit breaker.

Element 11: wherein the trip circuit is coupled to a self-power relay of a sulfur hexafluoride (SF6) switchgear downstream from a main substation receives power from a transmission line, such that the trip circuit resolves incident energy upstream from the SF6 switchgear by changing from the normal setting to the reduced setting. Element 12: wherein the trip circuit operates in a normal setting in response to the switch being open and the first BO terminal provides energy to the trip coil. Element 13: wherein the trip circuit operates in a reduced setting in response to closing the switch to provide energy to the trip coil by the first subset of BOs, thereby increasing sensitivity of the trip coil to overcurrent.

By way of non-limiting example, exemplary combinations applicable to A and B include: Element 1 with Element 2; Element 2 with Element 3; Element 3 with Element 4; Element 2 with Element 5; Element 5 with Element 6; Element 2 with Element 7; Element 7 with Element 8; Element 2 with Element 9; Element 9 with Element 10; Element 10 with Element 11; and Element 12 with Element 13.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation used herein are merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

The invention claimed is:

1. A trip circuit comprising:

a trip coil with a first coil terminal coupled to a first bus line;

a self-power relay that provides energy to the first bus line and a second bus line a normal setting contact and a reduced setting contact each coupled to the second bus line and a second coil terminal of the trip coil in parallel; and a first output contact in series with the normal setting contact and a second output contact in series with the reduced setting contact.

2. The trip circuit of claim 1, further comprising a switch to control the normal setting and reduced setting contacts.

3. The trip circuit of claim 2, wherein the trip circuit operates in a normal setting in response to the switch closing the normal setting contact and opening the reduced setting contact.

4. The trip circuit of claim 3, wherein the first output contact is closed by the self-power relay to energize the trip coil.

5. The trip circuit of claim 2, wherein the trip circuit operates in a reduced setting in response to the switch opening the normal setting contact and opening the reduced setting contact.

6. The trip circuit of claim 5, wherein the second output contact is closed by the self-power relay to energize the trip coil.

7. The trip circuit of claim 2, wherein the first output contact is coupled to a first subset of Binary Outputs (BOs) of the self-power relay and the second output contact is coupled to a second subset of BOs of the self-power relay.

8. The trip circuit of claim 7, wherein the first and second bus lines are coupled to Impulse Outputs (POs) of the self-power relay.

9. The trip circuit of claim 2, wherein the trip circuit is controlled to operate in a reduced setting from a normal setting by completing the trip circuit in response to closing the reduced setting contact.

10. The trip circuit of claim 9, wherein the trip circuit is coupled to a self-power relay of a circuit breaker at a substation along a transmission line that experiences incident energy above a predetermined threshold at an area upstream from the circuit breaker.

11. The trip circuit of claim 10, wherein the trip circuit is coupled to a self-power relay of a sulfur hexafluoride (SF6) switchgear downstream from a main substation receives power from a transmission line, such that the trip circuit resolves incident energy upstream from the SF6 switchgear by changing from the normal setting to the reduced setting.

12. A trip circuit for protecting a power distribution system comprising:

a trip coil with a first coil terminal coupled to a first bus line and a second coil terminal coupled to a first Binary Output (BO) terminal of a first subset of BOs of a self-power relay;

a switch having a first switch terminal coupled to the second coil terminal and a second switch terminal coupled to a second BO terminal of the first subset of BOs of the self-power relay and a second bus line, wherein the self-power relay provides energy to the first and second bus line via Impulse Outputs (POs).

13. The trip circuit of claim 12, wherein the trip circuit operates in a normal setting in response to the switch being open and the first BO terminal provides energy to the trip coil.

14. The trip circuit of claim 13, wherein the trip circuit operates in a reduced setting in response to closing the switch to provide energy to the trip coil by the first subset of BOs, thereby increasing sensitivity of the trip coil to overcurrent.

* * * * *